May 27, 1941. H. R. VAN DEVENTER ET AL 2,243,447
REFRIGERATING APPARATUS
Original Filed Aug. 7, 1929   5 Sheets-Sheet 3

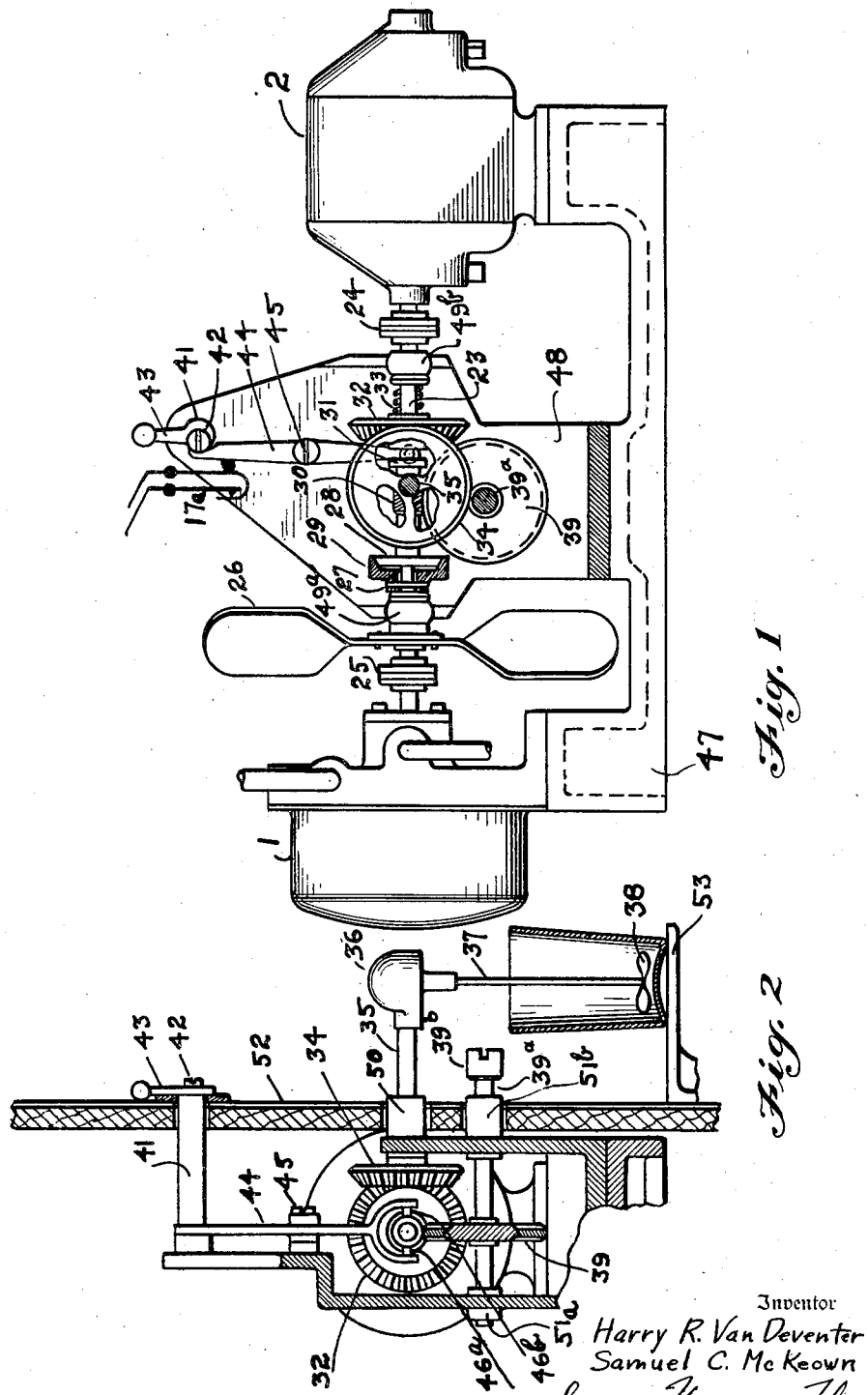

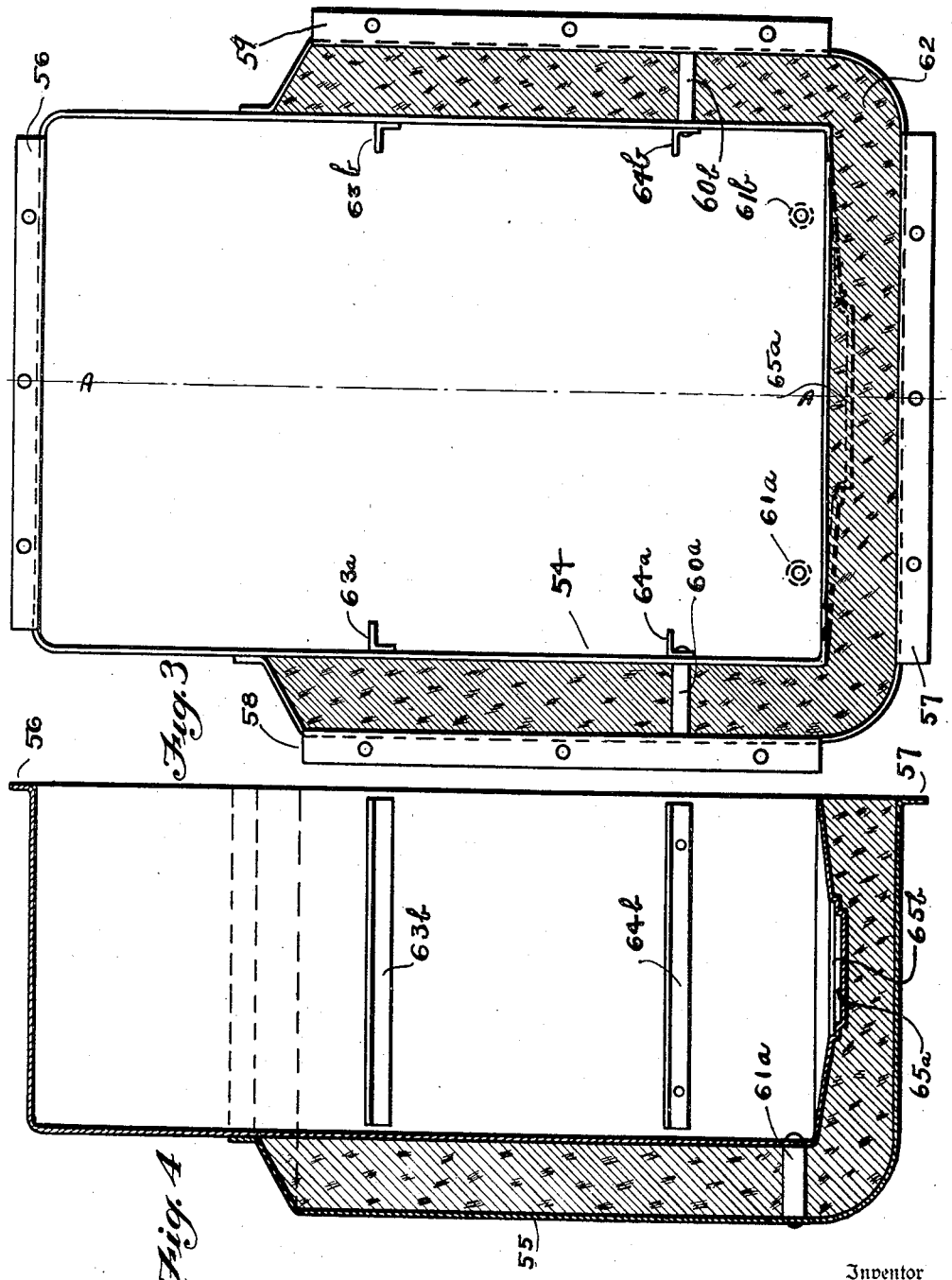

Inventor
Harry R Van Deventer
Samuel C McKeown
Attorneys

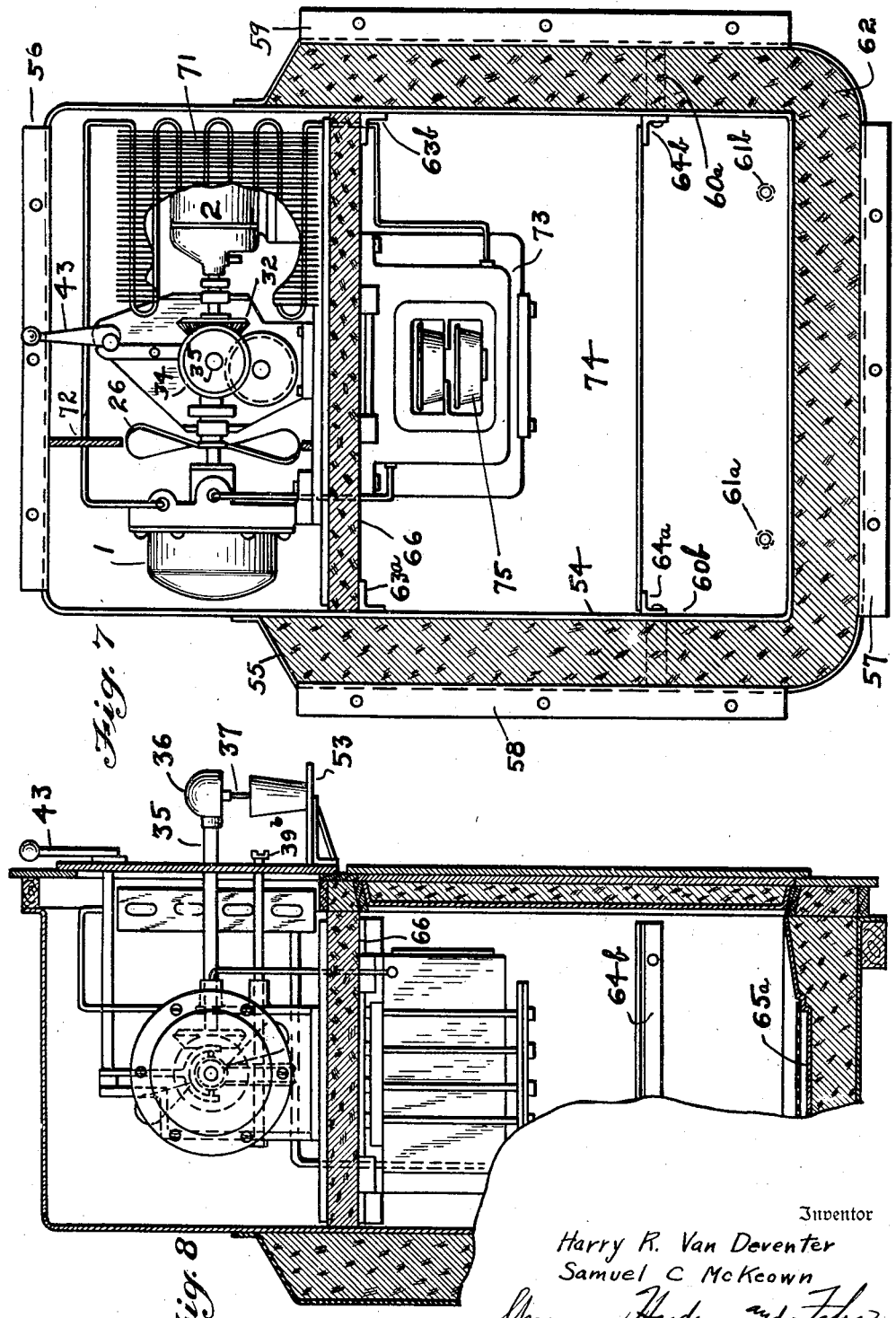

May 27, 1941.    H. R. VAN DEVENTER ET AL    2,243,447
REFRIGERATING APPARATUS
Original Filed Aug. 7, 1929    5 Sheets-Sheet 5
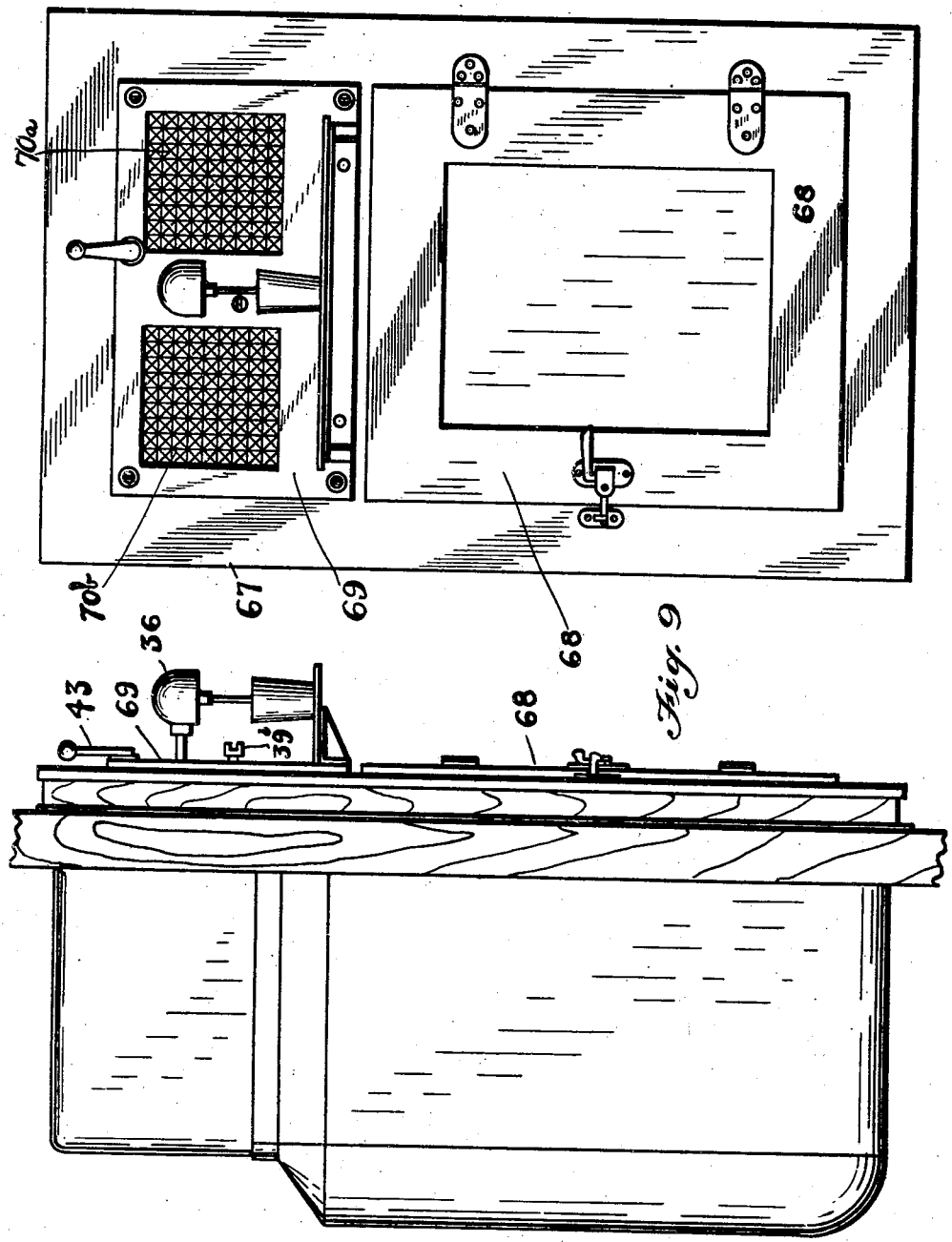
Inventor
Harry R. Van Deventer
Samuel C. McKeown Patented May 27, 1941

2,243,447

UNITED STATES PATENT OFFICE 2,243,447

REFRIGERATING APPARATUS

Harry R. Van Deventer, New York, and Samuel C. McKeown, Mount Vernon, N. Y., assignors to General Motors Corporation, Dayton, Ohio, a corporation of Delaware Original application August 7, 1929, Serial No. 384,014. Divided and this application January 21, 1937, Serial No. 121,550

2 Claims. (Cl. 62—89)

This application is a division of our copending application S. N. 384,014 filed August 7, 1929, now Patent No. 2,075,840, issued April 16, 1937.

This invention relates to refrigerating apparatus and more particularly to refrigerated insulated enclosures.

It is an object of our invention to provide a construction in which an insulated refrigerator cabinet with unfinished outer surfaces is built into a niche in the inner face of the wall of a building.

A further object of the invention is to provide a household refrigerator adapted to be built into the wall of the house or room, having the mechanism removable from the refrigerator without removing the latter from the wall, and also providing means for air cooling the mechanism, without the necessity of an air duct or flue, by means of air circulation from the front of the refrigerator.

Further objects and advantages of the present invention will be apparent from the following description, reference being had to the accompanying drawings, wherein a preferred form of the present invention is clearly shown.

Fig. 1 shows a motor-compressor unit provided with an arrangement for utilizing the power from the motor for operating domestic and kitchen devices, such as a drink or food mixer;

Fig. 2 is a side view of Fig. 1 showing a drink mixer in position as an attachment, operated by a high speed drive, together with a portion of the cabinet;

Fig. 3 is a front view of the cabinet only;

Fig. 4 is a sectional view of the cabinet taken on the line A—A of Fig. 3;

Fig. 7 is a front view showing the motor-compressor unit in position in the cabinet;

Fig. 8 is a side vertical sectional view through the cabinet with the motor-compressor unit in position;

Fig. 9 is a front view of the cabinet in position in the wall of a building; and Fig. 10 is a side view of the cabinet in position in the wall of a building.

Figure 5:
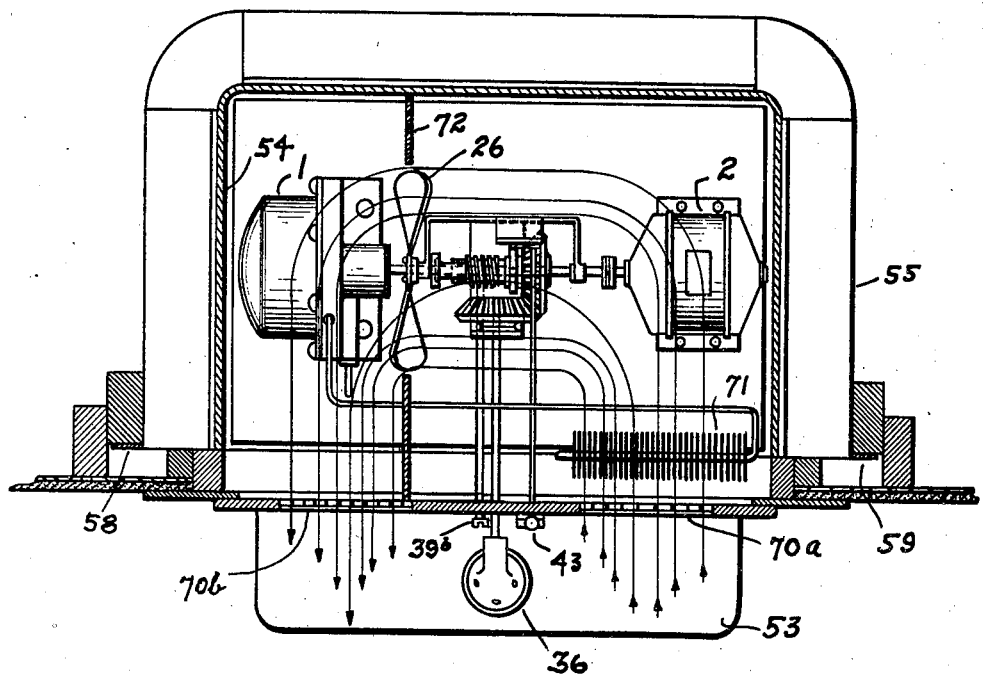
Fig. 5 is a top view of the motor-compressor unit in position in the cabinet showing the method of air circulation for cooling the mechanism.
Figure 6:
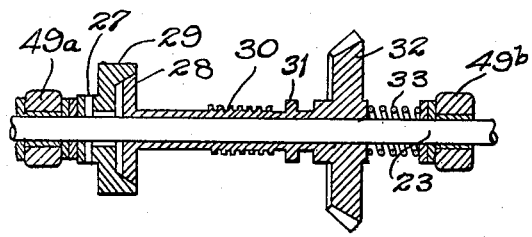
Fig. 6 is an enlarged cross sectional view of a portion of the mechanism shown in Fig. 1.

The arrangement shown in Fig. 1 is designed to utilize the power of the motor for driving various kitchen appliances and the like, adapted to be temporarily connected to the mechanism, two speeds being available to cover the speed range of the different devices. The cabinet is especially designed to accommodate the mechanism shown in Fig. 1, but is also applicable to other designs of motor-compressor units.

The motor 2 drives the pump 1 by means of the shaft 23 and the flexible couplings 24 and 25. The fan 26 is also secured to the shaft 23 to insure the usual circulation of air for cooling the condenser 71 (Fig. 5), the motor 2 and in some cases the pump.

Mounted on shaft 23, and secured thereto by the pin 27 is the female clutch member 29. Engageable therewith, but otherwise rotatable on the shaft 23, is the male clutch member 28 which is preferably integral with the worm 30, the shift collar 31, and the miter gear 32. Under stress of the spring 33 the clutch member 28 engages the clutch member 29, so that the worm 30 and the gear 32 are rotated by the shaft 23. Simultaneously the miter gear 34 rotates the shaft 35, having a suitable clutch similar to clutch 39b adapted to operate the usual detachable gear head 36, the vertical shaft 37, and the mixer blade 38 or any other device desired. At the same time the worm 30 engages and rotates at reduced speed the worm gear 39, its shaft 39a, clutch 39b and any device or mechanism attached thereto. Obviously the gear head 36 may be permanently connected and the device 37 may be detachable instead of the arrangement just described.

To disengage the clutch and stop the motion of shafts 35 and 39a, the small eccentric 41 is partially rotated around its fulcrum 42 by means of lever 43. This rocks the yoke lever 44 on its fulcrum 45 and the pins, 46a 46b engaging the groove in shift collar 31, and serves to shift the male clutch member 28 longitudinally out of engagement with the female clutch member 29, as well as the miter gear 31 out of engagement with the miter gear 34, thus allowing the shaft 23 to continue in operation driving the pump 1.

The main base 47 supports, in alignment, the pump 1, the motor 2 and frame 48, the latter in turn carrying a main shaft 23 in bearings 49a—49b an auxiliary shaft 35 in bearing 50, and another auxiliary shaft 39a in bearings 51a—51b. A fulcrum 45, an eccentric 41 and a fulcrum 42 are also mounted on the frame 48.

The front of the containing cabinet is shown at 52 and 53 is a shelf or support for a drinking glass or other container.

The switch 17a is closed when the lever 43 is thrown to "on" or operating position, and opened when 43 is returned to "off" or normal position.

It is well known that there is not enough room in a small kitchen or kitchenette for the ordinary refrigerator cabinet and while obviously a place could be provided for it in the wall, such arrangements necessitate (with existing cabinets) removing the entire cabinet to gain access to the mechanism, and special provision must be made for cooling the condenser and motor and with the additional mechanism for operating attachments as herein described, a special cabinet is desirable. This special cabinet may be easily and cheaply built into the wall of a room or house, and permits ready access to the mechanism for repairs or adjustment without removing the cabinet. When the refrigerating motor is used for operating other power driven devices its utility is greatly increased, as a complete small power plant is at the user's disposal without additional room space being necessary if the special cabinet herein described is used.

In Fig. 4 the numeral 54 denotes an inner steel casing, preferably enameled so as to form a suitable refrigerator lining, 55 is an outer steel casing. Both 54 and 55 are provided with suitable flanges 56, 57, 58, 59 and are secured together in any suitable manner such as by heat insulating members, some of which are shown at 60a, 60b, 61a, 61b. This arrangement provides a cabinet having a hollow wall which may be filled with any suitable heat insulating medium such as cork, wool, wood or the like, this forming the usual refrigerator wall. This form of construction allows the inner and outer members to be shipped "knocked down" to the building where they are to be used, and there assembled and the insulation 62 put in place, resulting in a large saving in transportation charges.

The cabinet is provided with the angle strips 63a, 63b, 64a, 64b, which support the mechanism and the shelves. The bottom of the inner casing may be formed with a depression 65a for collecting the drip when defrosting or a pan 65b may be placed in the depression as shown in the figure.

The mechanism shown in Fig. 1, or any suitable refrigerating machine, may be used. This is mounted on a shelf 66 preferably of heat insulating material, adapted to slide into the cabinet and form the top of the food compartment, as shown in Figs. 7 and 8, the shelf 66 being removably supported by the angle strips 63a, 63b.

It will now be obvious that the cabinet complete with its lining 62 can be set into a wall the outer edge flush therewith, and left without the shelf 66 and the mechanism carried thereby, which may be put in place when actually required for use, and furthermore, that all the mechanism is removable at any time without disconnecting any of its component parts and without removing the cabinet from the wall.

As the cabinet sets in a wall usually of brick or tile which are in themselves good insulators, the amount of insulation at 62 may be reduced to a minimum.

The cabinet is set in the wall by securing the same thereto by means of nails, screws or bolts through flanges 56, 57, 58, 59 into the wall, or into the studding set therein. To secure a finish and provide a front for the cabinet, a plate or trim 67 is provided carrying hinges and locks for the refrigerator door 68.

A panel 69 attached to plate 67 by screws or any other suitable manner is provided to cover the machine compartment. This arrangement provides a cabinet practically flush with the wall.

Proper cooling of the condenser and motor is accomplished as shown in Fig. 5 by providing the panel 69 with grids, louvres or some such openings 70a, 70b. The air is drawn by fan 26 into the openings in 70a, passes over or through the condenser 71, the motor 2, and if necessary over the pump 1 and is discharged at 70b. The fan 26 may be placed in a suitable shroud or partition 72 dividing the machine compartment between 70a and 70b, to insure proper air circulation.

The operation of the refrigerating mechanism is not described in detail as any suitable type of apparatus may be used. The evaporator or cooling unit 73 is supported below the shelf 66 and extends downwardly into the food chamber may be provided with the usual ice trays 75.

While the form of embodiment of the invention as herein disclosed, constitutes a preferred form, it is to be understood that other forms might be adopted, all coming within the scope of the claims which follow.

What is claimed is as follows:

1. In combination with a building wall having an aperture therein, a refrigerator cabinet within said aperture comprising an inner box-shaped metal shell having its open side substantially in the face of the wall, an outer shell forming a pocket with said inner shell at the bottom, back and sides of the latter, insulating means between said inner and outer shells, said inner and outer shells being provided with flange means adjacent their front edges, and a cabinet front covering the aperture in said building wall and being fastened to said flanges, said cabinet front being provided with a door for access to the compartment enclosed by said inner shell.

2. In a refrigerator cabinet adapted to be mounted in a building wall and having a food storage compartment and a second compartment, a lining for the cabinet on the top, bottom, back and sides, insulating material embracing a portion of said lining adjacent the food storage compartment, a covering for said insulating material, a finished front side for said cabinet having a door for access to the food storage compartment and a separately removable front for said second compartment, said removable front having apertures therein for circulation of external air through the second compartment.

HARRY R. VAN DEVENTER.
SAMUEL C. McKEOWN.